F. A. BRAYMER & M. W. LYMAN.
Car-Axles.

No. 134,247.　　　　　　　　　　　Patented Dec. 24, 1872.

Witnesses.　　　　　　　　　　　Inventors
Harry King.　　　　　　　　　　Frederick A. Braymer
Harry Coleman.　　　　　　　　Myron W. Lyman
　　　　　　　　　　　　　　　by
　　　　　　　　　　　　　　　Dodge & Son
　　　　　　　　　　　　　　　their attys.

UNITED STATES PATENT OFFICE.

FREDERICK A. BRAYMER AND MYRON W. LYMAN, OF CHICAGO, ILLINOIS.

IMPROVEMENT IN CAR-AXLES.

Specification forming part of Letters Patent No. 134,247, dated December 24, 1872.

*To all whom it may concern:*

Be it known that we, FREDERICK A. BRAYMER and MYRON W. LYMAN, of Chicago, in the county of Cook and State of Illinois, have invented certain Improvements in Car-Axles, of which the following is a specification, reference being had to the accompanying drawing.

Our invention relates to that class of car-axles which permit their two wheels to turn independently of each other; and consists in a novel manner of constructing the same, as hereinafter fully explained.

Figure 1:
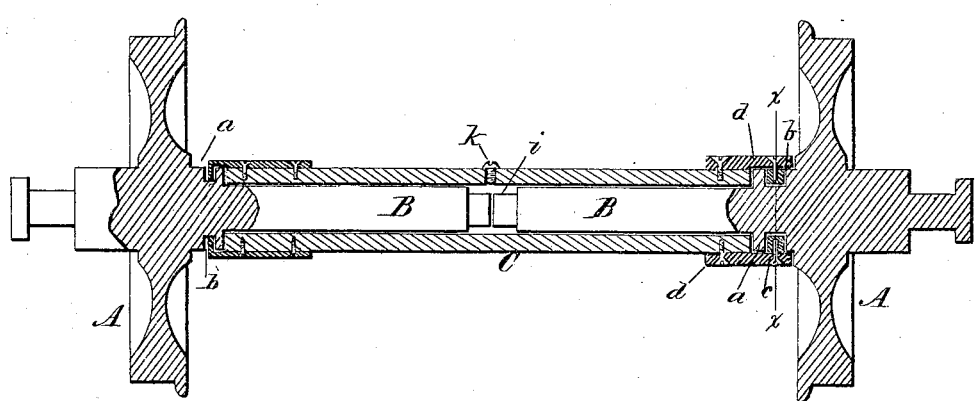
Figure 2:
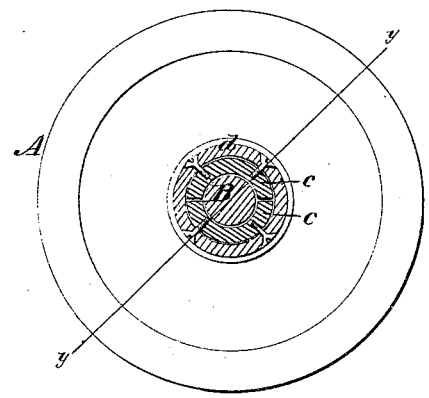

Figure 1 is a longitudinal section through a pair of wheels arranged on our plan; Fig. 2, a cross-section of the same on the line $x\ x$.

In carrying out our invention we provide a pair of ordinary car-wheels, A, and secure them rigidly upon two separate short axles, B, and then insert said axles into opposite ends of a long sleeve or tube, C, as shown. The sleeve thus arranged serves to connect the short axles and hold them in line with each other, end to end, while at the same time it permits them to turn independently of each other. The wheels we provide on their inner sides with round hubs or necks $a$, which are made of the same diameter as the sleeve C, and arranged to bear snugly against its ends, as shown. Around the outside of each hub or neck we form a groove, $b$, and in said groove place two half rings or boxes, $c$, so as to encircle the hub, as shown in Fig. 2, and on the right hand in Fig. 1. We then apply a ring or collar, $d$, around the neck and the end of the sleeve C, and bolt it securely to the sleeve and to the boxes or half rings $c$, as shown. The boxes being connected firmly to the collar, which is connected to the sleeve, they serve to hold the wheels up tightly in place, so that they cannot play laterally. The collar and boxes also serve to confine the oil or other lubricant within the sleeve C, and to exclude dust and dirt therefrom.

Instead of using the collar and boxes the wheels may be held up in place by simply attaching to the sleeve C straps or bars having their ends turned down into the groove of the hub, as shown on the left hand in Fig. 1.

It is obvious that, if preferred, the collar $d$ may be formed solidly upon and as a part of the sleeve; but it is preferred to make it separately, as shown.

The axles B we arrange so as to bear against each other at their inner ends, in order to prevent the wheels from being crowded up too forcibly against the ends of the sleeve.

In order to provide for the thorough and constant lubrication of the axles inside of the sleeve we reduce the diameter of their inner ends so as to leave an annular space or chamber, $i$, around them to contain a supply of oil or other lubricating material. Through the side of the sleeve we make a hole, $k$, to permit the introduction of the oil, the hole being afterward closed by a screw-plug, as shown. The oil contained in the space or chamber works gradually outward between all the wearing-surfaces, and keeps them thoroughly lubricated. If desired the space or chamber may be filled with any suitable packing material which will retain the oil and prevent a too rapid distribution of it.

The compound axle constructed on our plan is very simple, cheap, and strong; it permits the wheels to turn independently with perfect ease; it excludes dust and dirt from all the wearing-surfaces, and keeps the same thoroughly lubricated; and, what is very important, it is applicable to the ordinary cars now in use, in place of the common axles, without any change whatever.

We are aware that compound axles of various kinds have been heretofore constructed for the purpose of allowing an independent movement of the two wheels, but we believe that our arrangement differs from and is an improvement on such previous contrivances.

Having described our invention, what we claim is—

The combination of the independent axles B and tube C with the sleeve $c$ and divided collar $d$, or their equivalents, all constructed and arranged to operate substantially as described, whereby the parts subjected to wear can be replaced without detaching the wheels from the axle or removing the latter from the truck.

FREDERICK A. BRAYMER.
MYRON W. LYMAN.

Witnesses:
PHIL. T. DODGE,
HARRY KING.